United States Patent [19]

Bland et al.

[11] Patent Number: 5,141,920
[45] Date of Patent: * Aug. 25, 1992

[54] HYDROCARBON INVERT EMULSIONS FOR USE IN WELL DRILLING OPERATIONS

[75] Inventors: Ronald G. Bland; Dennis K. Clapper, both of Houston, Tex.

[73] Assignee: Baker Hughes Incorporated, Houston, Tex.

[ * ] Notice: The portion of the term of this patent subsequent to Oct. 15, 2008 has been disclaimed.

[21] Appl. No.: 771,767

[22] Filed: Oct. 4, 1991

Related U.S. Application Data

[62] Division of Ser. No. 536,735, Jun. 11, 1990, Pat. No. 5,057,234.

[51] Int. Cl.$^5$ ................................................ C09K 7/02
[52] U.S. Cl. ............................... 507/136; 166/301; 252/312
[58] Field of Search ................. 252/8.51, 8.511, 8.515, 252/8.514, 312; 166/301; 507/136

[56] References Cited

U.S. PATENT DOCUMENTS

| | | | |
|---|---|---|---|
| 3,217,802 | 11/1965 | Reddie et al. | 166/301 |
| 4,341,272 | 7/1982 | Marshall | 166/301 X |
| 4,427,564 | 1/1984 | Brownawell et al. | 252/8.51 |
| 4,436,638 | 3/1984 | Walker et al. | 166/301 X |
| 4,464,269 | 8/1984 | Walker et al. | 166/301 X |
| 4,596,662 | 6/1986 | Walker et al. | 252/8.51 |
| 4,658,901 | 4/1987 | Alexander | 166/301 |
| 4,830,765 | 5/1989 | Perricone et al. | 252/8.51 |
| 4,941,981 | 7/1990 | Perricone et al. | 252/8.51 |
| 4,963,273 | 10/1990 | Perricone et al. | 252/8.51 |
| 5,007,489 | 4/1991 | Enright et al. | 252/8.511 X |

*Primary Examiner*—Robert L. Stoll
*Assistant Examiner*—C. Sayala
*Attorney, Agent, or Firm*—Charles D. Gunter, Jr.

[57] ABSTRACT

Brine-in-glycol emulsions are shown for use as well working fluids. The fluids have a glycol external phase and a brine internal phase. The separate phases are emulsified to create an emulsion and weighted with traditional weighting agents. The external phase is soluble or dispersible in sea water when diluted upon discharge.

2 Claims, No Drawings

HYDROCARBON INVERT EMULSIONS FOR USE IN WELL DRILLING OPERATIONS

This application is a division of application Ser. No. 07/536,735, filed Jun. 11, 1990, now U.S. Pat. No. 5,057,234.

BACKGROUND OF THE INVENTION

1. Field of the Invention:

This invention relates to well working fluids useful in drilling, completing or workover of oil and gas wells, and, specifically, to an invert emulsion type fluid having a non-hydrocarbon, non-mineral oil external phase and an aqueous internal phase which provides many of the advantages of an oil-based mud without the attendant adverse environmental effects.

2. Description of the Prior Art:

During the drilling of oil and gas wells, drilling fluid is circulated through the interior of the drill string and then back up tot he surface through the annulus between the drill string and the wall of the borehole. The drilling fluid serves various purposes including lubricating the drill bit and pipe, carrying cuttings from the bottom of the well borehole to the surface of the ground, and imposing a hydrostatic head on the formation being drilled to prevent the escape of oil, gas or water into the well borehole during the drilling operations.

Occasionally during drilling, the drill string becomes stuck and cannot be raised, lowered or rotated. There are numerous causes for this problem, one of the most common being differential sticking. Differential sticking usually occurs when drilling permeable formations and borehole pressures are greater than formation pressures and when the drill pipe remains at rest against the wall of the borehole for enough time to allow mud filter cake to build up around the pipe. The pressure exerted by drilling fluid then holds the pipe against the cake wall.

For a number of years, oil-based fluids have been popular both as drilling fluids and as stuck pipe fluids. These fluids typically are comprised of a hydrocarbon oil or oils as the major component of the liquid phase to which various materials are added to impart the desired drilling fluid properties. These fluids are well adapted for use in underground formations containing water sensitive clays or shales which swell and disintegrate when contacted by water-based drilling fluids. Such fluids are substantially free of water, lose mostly oil as the filtrate and cause no swelling or disintegration of water sensitive clays and shales. One widely used oil-base fluid is described in U.S. Pat. No. 3,099,624, issued Jul. 30, 1963, to Doyne L. Wilson. Water-in-oil emulsions are also used as drilling fluids. These fluids contain a high percentage of oil and a lesser percentage of water dispersed in the continuous or external phase of oil.

In order to free stuck pipe, prior art treatments involve the placement in and movement through the circulating mud system of a volume of a release agent, known as a spotting fluid, which is sufficient to fully contact the region of the borehole where the pipe is stuck. Thus, a suitably weighted oil-based fluid is circulated in the borehole to a position opposite the stuck interval. Over a period of time, the integrity of the mud filter cake between the drill pipe and borehole is reduced, allowing pressure equalization on all sides of the pipe. The invasion of oil into the filter cake is also though to reduce the adhesive forces and lubricate the area between the pipe and borehole, resulting in less friction and quicker release.

Oil-based formulations used in the past as spotting fluids are described, for instance, in U.S. Pat. Nos. 4,436,638 and 4,464,269. Water-based formulations are also known for use in releasing differentially stuck pipe. They are described, for instance, in U.S. Pat. Nos. 3,233,622; 4,230,587; 4,466,486; and 4,614,235. To our knowledge, invert emulsions having a non-hydrocarbon, non-mineral oil external phase and an aqueous internal phase have not been utilized.

Environmental regulations have recently either prohibited or severely limited the use of oil-based and invert emulsion oil muds as either drilling fluids or as spotting fluids. In many offshore areas, such as the Gulf of Mexico, the use of oil muds is strictly regulated. Restrictive regulations have thus created a need for a novel fluid which will fill the niche formerly occupied by oil muds, i.e., drilling fluids for active argillaceous formations, and spotting fluids used for release drill pipe held by differential pressure.

The present invention has as its object to provide such a replacement fluid for an oil-base mud which has significant advantages over water-based fluids when used in the before mentioned well bore operations Another object of the invention is to provide a novel fluid for well bore operations which provides improved hole stability, bit lubrication, and which minimizes hydration and dispersion of shale within the circulating fluid system.

Another object of the invention is to provide such a fluid which will perform the function of an oil-based spotting fluid but which does not leave a sheen upon receiving waters and which meets current environmental toxicity standards, thereby eliminating environmental problems caused by oil-based fluids.

SUMMARY OF THE INVENTION

In the method of the invention, an invert emulsion well bore fluid is formed which comprises a non-hydrocarbon, non-mineral oil external phase and an aqueous internal phase. Preferably, the invert emulsion is a water-in-glycol emulsion having a glycol external phase and a salt solution or water internal phase. The water-in-glycol emulsion is formed by addition of water or a salt solution to a glycol that is not soluble in the aqueous phase. An emulsifier and a viscosifier are added to form a stable emulsion and a weighting agent is added to form a weighted well bore fluid. The weighted well bore fluid is then circulated in the well.

The water-in-glycol emulsion can be utilized as a spotting fluid for a stuck drill string by incorporating the brine-in-glycol emulsion into a conventional drilling fluid and contacting the borehole zone contiguous to the stuck drill string with the spotting fluid. This is accomplished by circulating the spotting fluid to the borehole zone contiguous to the stuck drill string.

Additional objects, features and advantages will be apparent in the written description which follows.

DETAILED DESCRIPTION OF THE INVENTION

The novel well bore fluids of the invention are invert emulsions which have a non-hydrocarbon, non-mineral oil external or "continuous" phase and an aqueous internal phase. The term "emulsion" is commonly used to describe systems in which water is the external or continuous phase and, e.g., oil is dispersed within the external phase. By the term "invert" is meant that the non-hydrocarbon, non-mineral oil substance is the continuous or external phase and that the aqueous fluid is the internal phase.

The External Phase

The non-hydrocarbon, non-mineral oil external phase can be any material which forms a stable emulsion with the internal phase, which is less toxic than invert hydrocarbon oil emulsions, which does not leave a sheen upon receiving waters, i.e., is water soluble or dispersible upon discharge at surface temperature and pressure conditions, as will be presently explained.

The material selected for the external phase can be any glycol which is otherwise compatible with the purposes of the invention, as will be explained. The preferred materials for the external phase are selected from the group consisting of polypropylene glycols, polypropylene glycol ethers, and propylene oxide polymeric adducts of alcohols or mixtures of alcohols. The preferred materials have molecular weights ranging from about 60 to 1000, most preferably about 250 to 1000. The molecular weight of the selected material should be such that the material is soluble or dispersible in sea water at a salinity of about 3% and lower but which is substantially insoluble in a brine such as 20 to 23% (saturated) sodium chloride solution, whereby a stable emulsion can be formed without the selected material forming a homogeneous solution with the aqueous phase.

In selecting a candidate material for the external phase, the characteristic "cloud point" of the material provides an indication of its molecular weight and thus of its ability to form a stable emulsion. The cloud point of the candidate material is preferably in the range from about 15° C. (50°-181° F.) for a test solution comprising at least 1% by weight of the candidate material. The "cloud point" for the candidate material can be determined by preparing a fluid comprising at least 1% by volume of the candidate material in deionized water or salt solution and heating the fluid until it first becomes cloudy. The cloud point is that temperature at which the material begins to come out of solution, thereby becoming immiscible in water and behaving in the nature of a free oil.

Particularly preferred materials for the external phase include polypropylene glycol having a cloud point of 122° F., supplied commercially as ARNOX D-400 by Baker Performance Chemicals and propoxylated tripropylene glycol bottoms having a cloud point in the range from 77°-160° F. The most preferred molecular weight range for these materials is about 250°-600° for the polypropylene glycol and 600-1000 for the propoxylated tripropylene glycol bottoms.

The preferred propylene oxide polymeric adducts are condensates of propylene oxide and optionally ethylene oxide with alcohols and include ethylene oxide-propylene oxide block copolymers of alcohol mixtures represented by the structural formula:

$$R-O-(CH_2CHO)_x-(CH_2CH_2O)_y-(CH_2CHO)_z-H$$
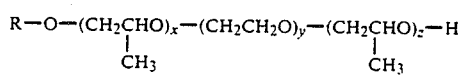

wherein R represents an alkyl group of from about 4–12 carbon atoms and x is an integer from about 0 to 10, y is an integer from about 5 to 20, and z is an integer from about 5 to 25. This preferred class of material can be obtained from Olin Chemicals under the trade name "POLY-TERGENT". The preferred material has a total molecular weight in the range of about 500-3000.

The propylene oxide adducts also include ethylene oxide-propylene oxide random copolymers of alcohols or alcohol mixtures having a structural formula:

$$R-O-(CH_2CHO)_n-(CH_2CH_2O)_m-H$$
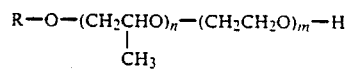

wherein R represents an alkyl group of from about 1–10 carbon atoms, n is an integer in the range from about 3–10 and m is an integer in the range from about 0–10. This preferred class of materials can be obtained from BASF Wyandotte Corporation under the trade name "PLURACOL W" and have a total molecular weight in the range from about 200-2000.

The polypropylene glycol ethers fall within a class of the general formula:

$$R_1-O-(C_2H_3-O)_n-R_2$$
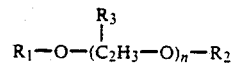

wherein $R_1$ represents hydrogen or a lower alkyl group of from 1 to 8 carbons, $R_2$ represents a lower alkyl group of from 1 to 8 carbons, $R_3$ represents hydrogen, methyl and ethyl and n represents an integer of 1 to 16, preferably 1 to 5. Included in this class are the methyl monoether of propylene glycol, ethyl monoether of propylene glycol, propyl monoether of propylene glycol, methyl monoether of dipropylene glycol and the ethyl monoether of dipropylene glycol.

Recent environmental regulations for offshore drilling fluids require that: (1) no "sheen" be left upon the receiving waters by the drilling fluid; and (2) that the drilling fluid meet stringent toxicity limits as measured by bioassays of Mysidopsis bahia shrimp. The Generic muds to be used with the Mysidopsis bioassay are described in T. W. Duke et al., "Acute Toxicity of Eight Laboratory Prepared Generic Drilling Fluids to Mysids", 1984, EPA 600, 3-84-067. The Myside shrimp bioassay measure of toxicity, or LC50, is the lethal concentration to kill 50% of the Mysid shrimp population. Preferably, the lethal concentration of a 10% by volume candidate weighted external phase material in a generic mud, as measured by Mysidopsis bahia bioassay LC50 analysis, should be greater than about 30,000 parts per million for a suitable candidate material.

It is also necessary that the external phase not "leave a sheen on receiving waters" upon discharge. That is, the brine-in-glycol invert emulsion, when diluted with sea water upon discharge is water soluble or dispersible and leaves no oil-like sheen. Thus, the candidate material must be immiscible in brine at a salinity of about 3% or greater but is soluble or dispersible in sea water when salinity drops below about 3%.

The Internal Phase

The brine used in forming the internal phase can be defined as an aqueous solution containing from about 100 to 350,000 parts per million metal ions such as lithium, sodium, potassium, magnesium, or calcium ions. The preferred brines used to form the internal phase of the emulsions of the invention contain from about 10 to about 23% (saturated) by weight sodium chloride and may contain various amounts of other dissolved salts such as sodium bicarbonate, sodium sulfate, sodium acetate, sodium borate, potassium chloride, or calcium chloride.

The ratio of brine to glycol in the emulsions of the invention should generally provide as high a brine content as possible while still maintaining a stable emulsion since a high water content drilling fluid is less expensive and less objectionable to work with than a drilling fluid containing a low water content. Glycol/brine ratios in the range from about 82:18 to 55:45 have been found to work satisfactorily, depending upon the particular glycol chosen. Thus the water content of a typical drilling fluid prepared according to the teachings of the invention will have an aqueous (water) content of about 5 to 50 volume percent, with the most preferred range being about 20 to 40 volume percent, most preferably about 30 volume percent of the drilling fluid.

The Emulsifier

In order to form a stable emulsion, a surfactant or emulsifier is added to the external, the internal or both phases. The emulsifier can be any of a number of organic acids which are familiar to those skilled in the art, including the monocarboxyl alkanoic, alkenoic, or alkynoic fatty acids containing from 2 to 22 carbon atoms, and mixtures thereof. Examples of this group of acids include acetic, stearic, oleic, caproic, capric, butyric, behenic, palmitic, arachidic, myristoleixc, palmitoleic, elaidic, linoleic, linolenic, elaeostearic, and tarinic. Adipic acid, a member of the aliphatic dicarboxylic acids can also be used. The preferred surfactants or emulsifiers are fatty acid calcium salts, lecithin and lime. Lecithin is a mixture of the diglycerides of stearic, palmitic and oleic acids, linked to the choline ester of phosphoric acid. It is commercially available and is obtained from egg-yolk and soya beans.

Viscosifiers

Viscosifiers can also be added to improve the solids suspending ability of the well bore fluid. Suitable viscosifiers include the commercially available organophilic clays, bentonites, attapulgite clays, sepiolite, guar, carboxymethyl guar, hydroxypropyl guars, fumed silicas, fumed alumina, and the like. Preferred viscosifiers include sepiolite, organophilic clay and treated fumed silica.

Weighting Agents

Weighting materials can also be used to weight the well bore fluids of the invention to a density in the range from about 8.33 pounds per gallon to 15 pounds per gallon and greater. Weighting materials which are known in the art include barite, ilmenite, calcium carbonate, iron oxide and lead sulfide. The preferred weighting material is commercially available barite.

Three exemplary formulations follow which have produced weightable, stable emulsions. These formulations are based on three different suspending agents — sepiolite, organophillic clay, and treated fumed silica. The method of forming these three types of glycol emulsions can be briefly described as follows:

(1) Sepiolite Formulation

Salt water (20% aqueous sodium chloride) is viscosified by mixing sepiolite with the salt water in a blender. The brine/sepiolite slurry is added to a blend of polypropylene glycol, crude tall oil fatty acid, lecithin (CLEARATE B-60 from W. A. CLEARY CORP.) and lime. The combined mixture is blended vigorously to produce an invert emulsion. Preferably, the emulsion is prepared using a high glycol-to-brine ratio such as 82:18. The glycol/brine ratio may be reduced to 55:45 by the addition of 20% (aq) sodium chloride.

(2) Organophilic Clay Formulation

A mixture of polypropylene glycol, crude tall oil fatty acid, lecithin (CLEARATE B-60 from W. A. CLEARY CORP.) and lime is mixed for several minutes in a blender. Organophilic clay is added and the mixture is blended at high shear for ten minutes. Salt water is then added during high shear to produce the emulsion. Barite must be added immediately to maintain the emulsion.

(3) Treated Fumed Silica Formulation

Propoxylated tripropylene glycol bottoms, molecular weight around 600, is viscosified with a treated fumed silica (CAB-O-SIL TS - 610 from CABOT CORP.) This glycol has a relatively low cloud point of 78° F. (50% solution is dionized water). A typical formulation includes crude tall oil fatty acid, lime, and 20% (aq) sodium chloride. Glycol/brine ratios range from 60/40 to 80/20. Preparation requires moderate shear, and emulsions are stable without barite.

Rheological properties of the brine-in-glycol emulsions were measured with a Fann 35 Viscometer following API RP 13B. Most samples were aged statically and sometimes dynamically at 150° F.

The following examples are intended to be illustrative of the invention without being limiting:

EXAMPLE I

A brine-in-glycol emulsion with a glycol/brine ratio of 82:18 (Table 1) was made by first preparing a sepiolite/brine suspension by mixing a sepiolite/20% (aq) sodium chloride slurry for several minutes in a bar mixer or blender. The sepiolite suspension was then added to a mixture of polypropylene glycol 400 (cloud point 122° F. for 50% in deionized water), crude tall oil fatty acid, CLEARATE B-60 (W. A. CLEARY CORP.) and lime, and shearing the mixture for several minutes to emulsify the brine. Higher brine content emulsions were prepared by adding while mixing 20% (aq) sodium chloride to produce 70:30 and 55:45 brine-in-glycol emulsions. The densities of the 55:45, 70:30, and 82:18 emulsions were increased by the addition of barite. Rheological properties of these emulsions are listed in Tables 2 and 3.

TABLE 1

FORMULATION FOR 82:18 BRINE-IN-GLYCOL EMULSION
Example IA

| Material | Wt % |
|---|---|
| PPG 400 | 77.29 |
| Tall Oil | 0.83 |
| CLEARATE B-60 | 0.83 |
| Lime | 0.21 |
| 20% (aq) NaCl | 19.46 |
| Sepiolite | 1.38 |
| Total | 100 |

TABLE 2

FORMULATION AND 120° F. RHEOLOGY OF 12 PPG BRINE-IN-GLYCOL EMULSION

| Example | IB | IC |
|---|---|---|
| PPG/Brine Ratio, v/v | 55/45 | 82/18 |
| Formulation | | |
| Emulsion, g | 334 | 334 |

TABLE 2-continued
FORMULATION AND 120° F. RHEOLOGY OF 12 PPG BRINE-IN-GLYCOL EMULSION

| Example | IB | IC |
|---|---|---|
| Barite, g | 169 | 179 |
| Rheology at 120° F. | | |
| AV, cP | 113 | 56.5 |
| PV, cP | 85 | 56 |
| YP, lb/100 ft$^2$ | 56 | 1 |
| 10 Sec Gel, lb/100 ft$^2$ | 12 | 2 |
| 10 Min Gel, lb/100 ft$^2$ | 16 | 3 |

TABLE 3
FORMULATION AND 120° F. RHEOLOGY OF WEIGHTED 70:30 BRINE-IN-GLYCOL EMULSIONS

| Example | ID | IE | IF |
|---|---|---|---|
| Density, lb/gal | 12 | 14 | 15 |
| Formulation | | | |
| 70:30 Emulsion, g | 326 | 298 | 284 |
| Barite, g | 177 | 289 | 345 |
| Rheology at 120° F. | | | |
| AV, cP | 86.5 | 116 | 143.5 |
| PV, cP | 79 | 99 | 120 |
| YP, lb/100 ft$^2$ | 15 | 34 | 47 |
| 10 Sec Gel, lb/100 ft$^2$ | 4 | 8 | 14 |
| 10 Min Gel, lb/100 ft$^2$ | 5 | 12 | 22 |

EXAMPLE II

In order to evaluate the emulsions of the invention as drilling fluids, approximately 29 gallons of 56:44 brine-in-glycol emulsion containing 4% (v/v) REV-DUST to stimulate the effects of drill cuttings, and having a density of 9.50 lb/gal were prepared for microbit drilling tests. An 82:18 (glycol/brine) emulsion was made by the addition of a previously prepared sepiolite-in-brine suspension to a mixture of polypropylene glycol 400, crude tall oil fatty acid, CLEARATE B-60, and lime. The fluid was stirred vigorously with two Dispersators for approximately 30 minutes. The 82:18 emulsion was cut to a 56:44 glycol/brine emulsion by adding more 20% (aq) sodium chloride. The fluid was completed by the addition of 36 lb/bbl (4% by volume) REV-DUST. Ingredients used to make the glycol emulsion are listed in Table 4. Properties of the glycol emulsion are contained in Table 5.

TABLE 4
FORMULATIONS OF MICRO-BIT TEST FLUIDS

| Ingredient | Concentration |
|---|---|
| Example IIA Invert Glycol Emulsion | |
| PPG 400 | 23.5 gal/bbl |
| Tall Oil | 2.1 lb/bbl |
| CLEARATE B-60 | 2.1 lb/bbl |
| Lime | 0.5 lb/bbl |
| Sepiolite | 3.5 lb/bbl |
| 20% (aq) NaCl | 18.3 gal/bbl |
| REV-DUST | 36 lb/bbl |
| Example IIB Lignosulfonate Fluid | |
| Deionized Water | 40.3 gal/bbl |
| Bentonite | 25 lb/bbl |
| Chrome Lignosulfonate | 0.2 lb/bbl |
| REV-DUST | 36 lb/bbl |
| NaOH | 0.1 lb/bbl |
| Barite | 28 lb/bbl |

TABLE 5
PROPERTIES OF MICRO-BIT TEST FLUIDS

| | Example IIA | Example IIB |
|---|---|---|
| Density, lb/gal | 9.5 | 9.5 |
| PV, cP | 13 | 75 |
| YP, lb/100 ft$^2$ | 5 | 53 |
| 10 Sec Gel, lb/100 ft$^2$ | 2 | 7 |
| 10 Min Gel, lb/100 ft$^2$ | 9 | 9 |

The invert glycol emulsion was used in a microbit drilling testor to measure the ability of glycol emulsions to reduce bit balling on a polycrystalline diamond (PDC) bit when drilling a Pierre shale core. Tests were run on a lignosulfonate fluid for comparison to the performance of the invert glycol emulsion. A formulation and properties of the lignosulfonate mud are listed in Tables 4 and 5 respectively. Tests were conducted using a 2-cutter PDC microbit (1.125" O.D.) equipped with two 0.094" O.D. nozzles. Rotary speed was kept constant at 103 rev/min, and rate of penetration was kept at 25 to 30 ft/hour. Maximum flow rate was 15 gal/minute. During the evaluation of each fluid, flow rate was reduced until bit balling was observed. Under the same experimental conditions, a fluid that prevents bit balling at a lower flow is considered to be more effective than a fluid that requires a higher flow rate to keep the bit clean. The test results in Table 6 indicate that when the glycol emulsion fluid was used, extensive balling occurred when the flow rate was reduced to 3.2 gal/minute. In contrast to the relatively low flow rate required for bit cleaning while drilling with the glycol emulsion, extensive bit balling was observed with the lignosulfonate mud using a flow rate as high as 13 gallon/minute.

TABLE 6
MICRO-BIT TEST RESULTS

| | Observed Balling | |
|---|---|---|
| Flow Rate (gal/min) | Example IIA (Invert Glycol Emulsion) | Example IIB (Lignosulfonate Mud) |
| 15 | — | moderate |
| 13 | — | extensive |
| 11 | none | extensive |
| 9 | slight | extensive |
| 4 | none | — |
| 3.5 | none | — |
| 3.2 | extensive | — |

EXAMPLE III

Brine-in-glycol emulsions can be prepared by adding 20% (aq) sodium to a mixture of PPG 300 (cloud point of 159° F. for 50% solution in deionized water) or PPG 400, tall oil, lecithin (CLEARATE B-60), and lime. First, an organophilic clay such as Bentone SD-1, SD-2, SD-3, or EW (NL Chemicals) is added to a mixture of polypropylene glycol, tall oil, lecithin, and lime. The mixture is sheared for approximately ten minutes with a blender on high speed. Next, aqueous sodium chloride is added with vigorous mixing for several minutes. Finally, barite is added and the emulsion is mixed for several minutes to insure adequate suspension of the barite. These brine-in-glycol emulsions are not stable until solids such as barite are added.

Formulations for these emulsions are listed in Tables 7 and 9 while rheological properties of these emulsions are listed in Table 8 and 10.

TABLE 7

FORMULATIONS FOR 12 PPG, 70:30 PPG-400 EMULSIONS

| Example | IIIA | IIIB | IIIC | IIID |
|---|---|---|---|---|
| PPG 400, g | 237 | 237 | 237 | 237 |
| Tall Oil, g | 5 | 5 | 5 | 5 |
| CLEARATE B-60, g | 5 | 5 | 5 | 5 |
| Lime, g | 4 | 4 | 4 | 4 |
| Organophilic | 8 | 8 | 8 | 8 |
| Clay, g | SD-1 | SD-2 | SD-3 | EW |
| 20% (aq) NaCl, cc | 100 | 100 | 100 | 100 |
| Barite, g | 198 | 198 | 198 | 198 |

TABLE 8

120° F. RHEOLOGY OF 12 PPG, 70:30 PPG 400 EMULSIONS AFTER 16 HR STATIC AGING AT 150° F.

| Example | IIIA | IIIB | IIIC | IIID |
|---|---|---|---|---|
| AV, cP | 76.5 | 84 | 89.5 | 75.5 |
| PV, cP | 63 | 69 | 70 | 52 |
| YP, lb/100 ft$^2$ | 27 | 30 | 39 | 47 |
| 10 Sec Gel, lb/100 ft$^2$ | 5 | 5 | 6 | 4 |
| 10 Min Gel, lb/100 ft$^2$ | 7 | 8 | 9 | 6 |

TABLE 9

FORMULATIONS FOR 12 PPG, 70:30 PPG 300 EMULSIONS

| Example | IIIE | IIIF | IIIG | IIIH |
|---|---|---|---|---|
| PPG 300, g | 237 | 237 | 237 | 237 |
| Tall Oil, g | 5 | 5 | 5 | 5 |
| CLEARATE B-60, g | 5 | 5 | 5 | 5 |
| Lime, g | 4 | 4 | 4 | 4 |
| Organophilic | 8 | 8 | 8 | 8 |
| Clay, g | SD-1 | SD-2 | SD-3 | EW |
| 20% (aq) NaCl, cc | 100 | 100 | 100 | 100 |
| Barite, g | 198 | 198 | 198 | 198 |

TABLE 10

120° F. RHEOLOGY OF 12 PPG, 70:30 PPG 300

| | IIIE | | IIIF | | IIIG | | IIIH | |
|---|---|---|---|---|---|---|---|---|
| Example | Initial | After* Static Aging | Initial | After Static Aging | Initial | After Static Aging | Initial | After Static Aging |
| AV, cP | 81.5 | 73.5 | 64.5 | 69.5 | 74.5 | 78 | 62.5 | 76.5 |
| PV, cP | 61 | 63 | 60 | 56 | 59 | 64 | 57 | 59 |
| YP, lb/100 ft$^2$ | 41 | 21 | 9 | 27 | 31 | 28 | 11 | 35 |
| 10 Sec Gel, lb/100 ft$^2$ | 8 | 4 | 2 | 4 | 6 | 4 | 2 | 3 |
| 10 Min Gel, lb/100 ft$^2$ | 11 | 5 | 4 | 7 | 10 | 6 | 3 | 5 |

*16 Hours at 150° F.

EXAMPLE IV

Brine-in-glycol emulsions can be prepared using organophilic silicas such as CAB-O-SIL TS-610 from Cabot Corporation. These emulsions are made by preparing a blend of CAB-O-SIL TS-610 or another organophilic silica, a propoxylated tripropylene glycol bottoms, tall oil, and lime. After the organophilic silica is dispersed in the fluid by mixing, 20% (aq) sodium chloride is added, and the mixture is sheared in a blender or bar mixer to produce a stable emulsion. Formulations and properties, both before and after heat aging, of unweighted examples are listed in Tables 11 and 12.

The densities of these brine-in-glycol emulsions may be increased by addition of barite, as illustrated in Table 13. These emulsions were found to be stable during either static or dynamic aging.

These emulsions were prepared with a propoxylated tripropylene glycol bottoms having an approximate molecular weight of 600 and a cloud point of 78° F. for a 50% solution in deionized water.

TABLE 11

FORMULATIONS FOR BRINE-IN-PPG 600 EMULSIONS

| Example | IVA | IVB | IVC | IVD | IVE | IVF | IVG |
|---|---|---|---|---|---|---|---|
| Glycol/Brine Ratio, v/v | 55/45 | 55/45 | 70/30 | 70/30 | 70/30 | 80/20 | 80/20 |
| PPG 600, g | 181 | 181 | 236 | 236 | 236 | 404 | 404 |
| CAB-O-SIL TS-610, g | 1.0 | 3.0 | 3.0 | 4.0 | 6.0 | 1.5 | 3.0 |
| Tall Oil, g | 15 | 15 | 10 | 10 | 10 | 15 | 15 |
| Lime, g | 5 | 5 | 4 | 4 | 4 | 6 | 6 |
| 20% (aq) NaCl, cc | 148 | 148 | 100 | 100 | 100 | 104 | 104 |

TABLE 12

120° F. RHEOLOGY OF BRINE-IN-PPG 600 EMULSIONS

| | IVA | | IVB | | IVC | | IVD | | IVE | | IVF | | IVG | |
|---|---|---|---|---|---|---|---|---|---|---|---|---|---|---|
| Example | Initial | After* Static Aging | Initial | After Static Aging | Initial | After Static Aging | Initial | After Static Aging | Initial | After Static Aging | Initial | After Static Aging | Initial | After Static Aging |
| AV, cP | 93 | 92 | 113 | 122 | 83.5 | 94.5 | 82 | 104.5 | 91 | 92 | 52.5 | 60 | 56.5 | 59.5 |
| PV, cP | 76 | 77 | 88 | 96 | 74 | 84 | 72 | 93 | 77 | 79 | 50 | 57 | 54 | 57 |
| YP, lb/100 ft$^2$ | 34 | 30 | 50 | 52 | 19 | 21 | 20 | 23 | 29 | 27 | 5 | 6 | 5 | 5 |
| 10 Sec Gel, lb/100 ft$^2$ | 4 | 5 | 6 | 12 | 4 | 6 | 6 | 4 | 6 | 11 | 1 | 1 | 1 | 2 |
| 10 Min Gel, | 8 | 9 | 13 | 27 | 9 | 10 | 12 | 7 | 11 | 18 | 2 | 2 | 2 | 3 |

TABLE 12-continued

| | 120° F. RHEOLOGY OF BRINE-IN-PPG 600 EMULSIONS | | | | | | | | | | | | | |
|---|---|---|---|---|---|---|---|---|---|---|---|---|---|---|
| | IVA | | IVB | | IVC | | IVD | | IVE | | IVF | | IVG | |
| Example | Initial | After* Static Aging | Initial | After Static Aging | Initial | After Static Aging | Initial | After Static Aging | Initial | After* Static Aging | Initial | After Static Aging | Initial | After Static Aging |
| lb/100 ft$^2$ | | | | | | | | | | | | | | |

*16 Hours at 150° F.

TABLE 13

FORMULATIONS FOR 12 PPG, PPG 600 EMULSIONS

| Example | IVH | IVI |
|---|---|---|
| Glycol/Brine Ratio, v/v | 60:40 | 70:30 |
| Formulation | | |
| PPG 600, g | 180 | 211 |
| CAB-O-SIL TS-610, g | 0.88 | 1.76 |
| Tall Oil, g | 8.8 | 8.8 |
| Lime, g | 3.5 | 3.5 |
| 20% (aq) NaCl, cc | 119 | 88 |
| Barite, g | 173 | 177 |

TABLE 14

120° F. RHEOLOGY OF 12 PPG, PPG 600 EMULSIONS

| | IVH | | | IVI | | |
|---|---|---|---|---|---|---|
| Example | Initial | After* Static Aging | After* Dynamic Aging | Initial | After Static Aging | After Dynamic Aging |
| AV, cP | 146.5 | 128 | 137 | 122 | 124 | 115 |
| PV, cP | 121 | 107 | 118 | 100 | 105 | 99 |
| YP, lb/100 ft$^2$ | 51 | 42 | 38 | 44 | 38 | 32 |
| 10 Sec Gel, lb/100 ft$^2$ | 25 | 16 | 13 | 14 | 11 | 8 |
| 10 Min Gel, lb/100 ft$^2$ | 39 | 27 | 22 | 26 | 21 | 15 |

*16 Hours at 150° F.

EXAMPLE V

In order to test the effectiveness of the additive compositions of the invention to release differentially stuck drill pipe, a filter cake was formed in an API filter press at 100 psi using a 13.3 lb/gal gypsum mud. The formulation and typical properties of the gypsum mud are listed in Table 15. After 8 ml of filtrate was collected, the filter cell was opened and a 316SS cone 1 inch high, 1⅜ inches in diameter at the base and 1 inch in diameter at the top, and having a convex base was placed so that the convex base of the cone rested on top of the filter cake. The filtration cell was reassembled and filtration was continued until a total of 20 ml of filtrate was collected. After pressure filtration was completed, excess mud was poured from the cell and the filter cake and attached cone were carefully removed. The cake/cone assembly was then placed in the bed of a Buchner funnel and seated under a vacuum of 29.8 inches of Hg. After the cake was seated, excess fluid which had been removed from the filter press was poured on top of the filter cake. Vacuum filtration was performed for fifteen minutes, after which excess mud was removed from the Buchner funnel. The additive composition of the invention (Table 16) was then placed in the Buchner funnel, and a 2 kg counterweight was suspended form the cone by means of a pulley. The time required for the additive composition to effect release of the cone was measured.

The results of the release times tests (Table 17) illustrate the ineffectiveness of the base mud and deionized water versus the effectiveness of the compositions of the invention.

TABLE 15

FORMULATION AND PROPERTIES OF 13.3 PPG STUCK PIPE SIMULATION TEST MUD

| Formulation | |
|---|---|
| 4900 cc | Deionized Water |
| 350 g | Bentonite |
| 56 g | Gypsum |
| 17.5 g | Chrome Lignosulfonate |
| 4200 g | Barite |
| Properties (Fann 35 Rheology At 120° F.) | |
| PV, cP | 12 |
| Yp, lb/100 ft$^2$ | 0 |
| 10 Sec Gel, lb/100 ft$^2$ | 2 |
| 10 Min Gel, lb/100 ft$^2$ | 15 |
| API Filtrate, cc | 52 |

TABLE 16

BRINE-IN-GLYCOL EMULSION FORMULATIONS FOR STUCK PIPE SIMULATION TEST

| Material | Concentration |
|---|---|
| EXAMPLE VA | |
| PPG 400 | 33.54 gal/bbl |
| Tall Oil | 3.0 lb/bbl |
| CLEARATE B-60 | 3.0 lb/bbl |
| Lime | 0.75 lb/bbl |
| Sepiolite | 5.0 lb/bbl |
| 20% (aq) NaCl | 7.38 gal/bbl |
| EXAMPLE VB | |
| 50:50 PPG 300/600 Blend | 32.9 gal/bbl |
| CAB-O-SIL TS-610 | 1.1 lb/bbl |
| Tall Oil | 0.4 lb/bbl |
| Lime | 4.0 lb/bbl |
| 20% (aq) NaCl | 8.5 gal/bbl |

TABLE 17

RELEASE TIMES FOR STUCK PIPE SIMULATION TEST

| Sample | Release Time (min) |
|---|---|
| Deionized Water | 90 (No Release) |
| 13.3 PPG Test Mud | 90 (No Release) |
| Example VA | 8.3 |
| Example VB | 7.6 |

The stable invert emulsion drilling fluid of the invention may be used in a process for drilling or completing a well where the emulsion drilling fluid is circulated down through the interior of the drill pipe and then back up to the surface through the annulus between the drill pipe and the wall of the borehole.

Alternatively, the invert emulsions of the invention may be used as spotting fluids. By this technique, a weighting material is mixed with the emulsion to produce a weighted spotting fluid. The weighted spotting fluid is then circulated downhole so as to position it to contact the drill string in the area adjacent the stuck zone. Such a fluid is effective as a spotting fluid which can be positioned in the borehole by techniques well known in the art.

An invention has been provided with significant advantages. When used as a drilling fluid, brine-in-glycol emulsions will have significant advantages over water-based drilling fluids. The novel emulsions will provide improved hole stability, and bit lubrication, and will minimize hydration and dispersion of shale within the mud system. As spotting fluids the glycol emulsions will perform the same function as than provided by oil-based spotting fluids, but without the environmental problems of oil-based fluids.

While the invention has been shown in only three of its forms, it is not thus limited but is susceptible to various changes and modifications without departing from the spirit thereof.

I claim:

1. An improved method of releasing a stuck drill string in the borehole of an underground formation during drilling operations employing a drilling fluid, the method comprising the steps of:

forming a brine-in-glycol invert emulsion having a glycol external phase and a brine internal phase by first combining a glycol which is soluble in a brine solution of about 3% salinity or less with a brine solution having a salinity greater than about 3%, thereby rendering the external phase and internal phase immiscible, the emulsion being characterized by the absence of hydrocarbon, mineral, vegetable and animal oils;

adding an emulsifier to form an emulsion;

adding a weighting agent to the emulsion to form a weighted spotting fluid;

circulating said weighted spotting fluid through said drilling fluid so as to contact the borehole zone contiguous with the stuck drill string to thereby release the stuck drill string.

2. A spotting fluid of the type used in releasing a stuck drill string in the borehole of an underground formation during drilling operations, the spotting fluid comprising:

an external phase consisting essentially of a glycol, and a brine internal phase, the external phase and the internal phase being combined to form an invert emulsion, the glycol external phase being characterized as having a molecular weight in the rang from about 250 to 1000, having a cloud point in the range from about 15° to 83° C. and being soluble or dispersible in sea water at a salinity of about 3% and lower;

an emulsifier; and a weighting agent.

* * * * *